US006322254B1

(12) United States Patent
Schwinghammer et al.

(10) Patent No.: US 6,322,254 B1
(45) Date of Patent: Nov. 27, 2001

(54) BEARING ASSEMBLY FOR A THREADED DRIVE

(75) Inventors: Reinhard Schwinghammer, Tuchenbach; Jürgen Hilbinger, Neustadt/Aisch, both of (DE)

(73) Assignee: INA Wälzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 09/535,917

(22) Filed: Mar. 24, 2000

(30) Foreign Application Priority Data

Mar. 24, 1999 (DE) ........................................ 199 13 200

(51) Int. Cl.$^{7}$ .......................... F16C 19/18; F16C 35/06

(52) U.S. Cl. ......................... 384/537; 384/504; 384/510

(58) Field of Search .................................. 384/504, 510, 384/513, 515, 517, 519, 537, 538, 539, 540, 542, 448

(56) References Cited

U.S. PATENT DOCUMENTS

| | | | | |
|---|---|---|---|---|
| 1,403,367 | * | 1/1922 | Whitney | 384/504 |
| 1,420,497 | * | 6/1922 | Page | 384/584 |
| 2,227,697 | | 1/1941 | Blood . | |
| 2,924,424 | | 2/1960 | Titterington . | |
| 3,639,019 | * | 2/1972 | Schaeffler | 384/537 |
| 3,986,754 | * | 10/1976 | Torrant | 384/504 |
| 4,366,995 | * | 1/1983 | Kocian | 384/510 X |
| 4,462,187 | * | 7/1984 | Dunn | 384/510 X |
| 4,806,028 | * | 2/1989 | Miller et al. | 384/510 |
| 5,667,313 | * | 9/1997 | Kapaan et al. | 384/544 |

FOREIGN PATENT DOCUMENTS

| | | |
|---|---|---|
| PS 5 05 282 | 8/1930 | (DE) . |
| PS 6 72 359 | 3/1939 | (DE) . |
| OS 20 28 762 | 12/1970 | (DE) . |
| 39 01 317 A1 | 7/1990 | (DE) . |
| 39 05 385 A1 | 8/1990 | (DE) . |
| 196 07 336 A1 | 8/1997 | (DE) . |

OTHER PUBLICATIONS

Das Wälzlager im Kraftfahrzeug, FAG, Kugelfischer Georg Schäfer & Co., Schweinfurt, Publ. No. 05 100, 1992, 92/8/4a/13, p. 23, 24.

P. 1, No. 159 063 in publication ZAE, issued by INA Waelzlager Schaeffler KG, and entitled “Lager für Gewindetriebe” (*Bearings for Threaded Drives*), Sep. 1996.

* cited by examiner

*Primary Examiner*—Thomas R. Hannon
(74) *Attorney, Agent, or Firm*—Henry M. Feiereisen

(57) ABSTRACT

A bearing assembly for a threaded drive, includes two grooved ball bearings arranged in side-by-side disposition and suited to one another for adjustment of a desired prestress, and a restraining element which holds the grooved ball bearings in place and is provided with a flange, directed radially outwards, for attachment to a housing. The restraining member is formed by a sleeve, made through a process without material removal, and has one end provided with a radially inwardly directed projection for embracing an end face of the grooved ball bearings.

18 Claims, 3 Drawing Sheets

BEARING ASSEMBLY FOR A THREADED DRIVE

CROSS-REFERENCES TO RELATED APPLICATIONS

This application claims the priority of German Patent Application Serial No. 199 13 200.3, filed Mar. 24, 1999, the subject matter of which is incorporated herein by reference.

BACKGROUND OF THE INVENTION

The present invention relates, in general, to a bearing assembly for a threaded drive, such as a rolling type screw drive in fine mechanics, and, more particularly, to a bearing assembly of a type having two rolling bearings arranged in side-by-side disposition and received by a restraining element about their outer surface area, with the restraining element being secured by a flange to a housing.

A bearing assembly of this type is illustrated on page 1 under the number 159 063 in publication ZAE, issued by INA Waelzlager Schaeffler KG, and entitled "Lager für Gewindetriebe" (Bearings for Threaded Drives), September 1996. The bearing assembly includes two axial angular contact ball bearings disposed in O-relationship and received by a massive restraining element which is secured to a housing via a circumferential flange with throughbores for passage of screw fasteners. The restraining element has a radially inwardly directed projection for protecting the bearing assembly at one end (the left hand side) via a fluid sealing. At the other side (right hand side), the bearing assembly is protected by a second fluid seal, formed through threaded engagement of a cover into the restraining element. The securement of this bearing assembly on a shaft is implemented by a precision nut which is provided with an inner thread and screwed on the shaft journal on the right hand side behind the axial angular contact bearings. When the precision nut is tightened, both inner rings of the bearing are moved toward one another, to thereby impart a desired prestress.

This conventional bearing assembly suffers many shortcomings. The restraining element has a complex configuration and can be manufactured only by a complicated, material-removing shaping process. Moreover, the sealing of the bearing assembly is very complicated because the bearing cover on the right side must be manufactured as an additional separate component with an outer thread. Also disadvantageous is the axial securement of the bearing assembly on the shaft by means of a precision nut, because the precision nut not only represents also a separate component and its manufacture is complicated but the provision of such a precision nut requires the formation of a threaded section on the shaft and also requires more space in axial direction for the bearing assembly. Finally, the fact that it is up to the expertise of the customer to adjust the desired prestress of the bearing assembly through tightening of the precision nut is also disadvantageous and may cause problems.

SUMMARY OF THE INVENTION

It is thus an object of the present invention to provide an improved bearing assembly, obviating the afore-stated drawbacks.

In particular, it is an object of the present invention to provide an improved bearing assembly for a threaded drive, which is easy to handle and manufactured in a very cost-efficient manner.

These objects, and others which will become apparent hereinafter, are attained in accordance with the present invention by providing two rolling bearings in the form of grooved ball bearings arranged in side-by-side disposition and suited to one another for adjustment of a desired prestress, and a restraining member which includes a flange directed radially outwards for attachment to a housing, and a sleeve, formed by a process without material removal, and having one end provided with a radially inwardly directed projection for embracing an end face of the grooved ball bearings.

In the following description, the term "suited" in conjunction with the grooved ball bearings will denote a clearance-free matching of the grooved ball bearings by preceding measurement of the axial offset between inner and outer rings. After measurement, the grooved ball bearings are subsequently selected either according to their axial extension of its bearing rings or, in accordance with another feature of the present invention, a fitting key is placed between the inner rings or outer rings. After selection of matching grooved ball bearings, the restraining element in the form of the sleeve is connected in a next process step, for example through press-fit between the outer surface area of the grooved ball bearing and sleeve, or through cementing the bearing in the restraining element.

In this manner, a self-contained structural unit is created which exhibits many advantages:

- Handling for the customer is significantly simplified because the bearing assembly is already prestressed when delivered to the customer, so that the need for an adjustment by the customer is eliminated.
- Fabrication of the bearing assembly is significantly more cost-efficient and simplified because sleeves of any dimensions can be easily produced through a non-cutting shaping process, for example, a deep-drawing process.
- Securement of the bearing assembly in the housing does not require additional components but only the provision of a planar connection surface with threading for attachment.
- Application of grooved ball bearings as rolling bearings are substantially more cost-efficient compared to axial angular contact ball bearings used heretofore.

According to another feature of the present invention, the fitting key may be provided in axial direction with an angled bead to thereby prevent an inward shift of the key between the bearing rings through gravitation during transport, and thus to prevent an obstruction of the shaft bore.

According to still another feature of the present invention, the grooved ball bearings are placed in relative X-disposition or O-disposition. Axial forces are thereby absorbed by a respective one of the bearings in both directions. In view of the great support width, the O-disposition results in a very rigid bearing for absorbing great tilting moments, whereas the X-disposition exhibits a small support width but does not pose any problems as far a precise alignment is concerned when several bearings are utilized. However, the slight rigidity of the X-disposition is less suitable to absorb tilting moments.

According to still another feature of the present invention, the grooved ball bearings have a sealing member at least at their end faces directed away from one another. This sealing member may be realized as fluid seal or as slip seal. This ensures a greased structural unit over its useable life so that the need for lubricating is eliminated because both sides are sealed.

The flange of the restraining member may be connected in one piece with the sleeve and located at one end of the sleeve, or the flange may be fabricated as a separate component and non-detachably secured to the sleeve, for example, through soldering, welding or gluing. When manufacturing the flange as separate component, the production of the sleeve without material removal can be further simplified.

According to another feature of the present invention, a second sleeve made through a process without material removal may be placed between a shaft and a receiving bore, when the grooved ball bearings are placed in O-disposition, with the sleeve having opposite ends, each end formed with a radially outwardly directed projection for embracing end faces of the inner rings. The second sleeve is provided to hold the inner rings together. Thus, the customer receives the bearing assembly already in prestressed state and does not require to prestress the bearing during installation.

According to still another feature of the present invention, the grooved ball bearings may be held in axial direction via a slotted bushing formed with a collar, with a ring placed over the collar. The ring reduces the diameter of the slotted bushing, i.e. the bushing is clamped radially in place by the ring so as to implement a secure fit of the grooved ball bearings, thereby eliminating the need for cutting a thread on the shaft for a precision nut.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
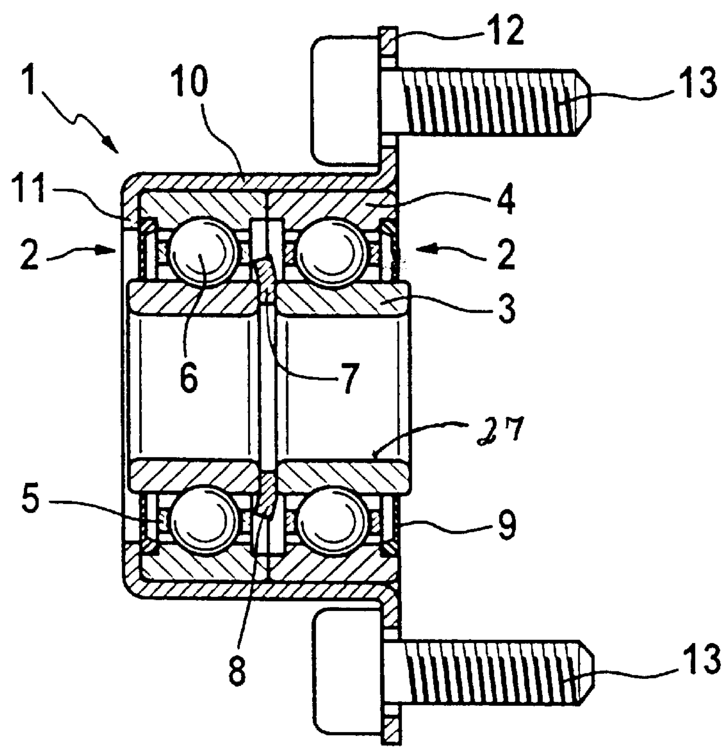
FIG. 1 is a longitudinal section of one embodiment of a bearing assembly according to the present invention.

Throughout all the Figures, same or corresponding elements are generally indicated by same reference numerals.

Turning now to the drawing, and in particular to FIG. 1, there is shown a longitudinal section of one embodiment of a bearing assembly according to the present invention, generally designated by reference numeral 1. The bearing assembly 1 includes two grooved ball bearings 2 which have inner rings 3 for defining a receiving bore 27 for a shaft 14 (FIG. 2), and outer rings 4. The grooved ball bearings 2 are arranged in side-by-side relationship in X-disposition, i.e. both inner rings 3 are pushed apart by a gap width which corresponds to the axial thickness of a disk-shaped key 7 placed between the inner rings 3. The key 7 is formed with a bead 8 which is angled in axial direction so as to prevent a slippage of the key 7 into the receiving bore 27 for the shaft 14 as a consequence of gravitational forces. The outer rings 4 of the grooved ball bearings 2 abut one another with their shoulders and are received in a sleeve 10 which is arranged in concentric surrounding relationship to the outer surface area of the outer rings 4 and is shaped through a process without material removal. The sleeve 10 has one end formed with a radially inwardly directed projection 11 which embraces the end face of the outer ring 4 positioned in FIG. 1 on the left-hand side of the two grooved ball bearings 2. At the opposite end, i.e. at the right-hand side of the bearing assembly 1, the sleeve 10 is provided with a flange 12 for attachment of the entire bearing assembly 1 to a planar surface of a housing (not shown) via screw fasteners 13. Balls 6 are held in a cage 5 between the inner rings 3 and the outer rings 4 and roll along the respective raceways.

The bearing assembly 1 is sealed against the outside by two seals 9 so as to prevent an escape of lubricant, located in the region of the raceways, to the outside and to prevent an ingress of dirt into the interior of the bearing assembly 1.

The formation of the bearing assembly 1 is as follows: Initially two grooved ball bearings 2 are randomly selected and the axial offset between the inner rings 3, on the one hand, and the outer rings 4, on the other hand, is registered. After determination of the offset and thus of the gap between the inner rings 3, a suitable fitting key 7 having the appropriate axial dimension is selected. Thus, after placement of the sleeve 10, a self-contained, prefabricated finished bearing assembly 1 is formed which is already prestressed and cannot disintegrate during transport to the customer. After receiving the prefabricated bearing assembly 1, the customer can install the bearing assembly 1, without any need for adjusting the prestress.

Figure 2:
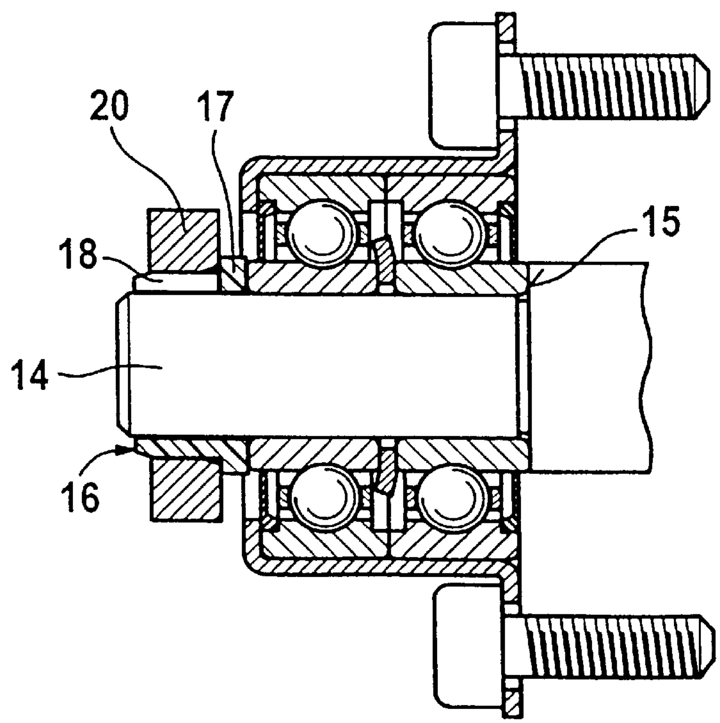
FIG. 2 is a longitudinal section of the bearing assembly of FIG. 1 in conjunction with a kit for securement of the bearing assembly to a shaft.
Figure 6:
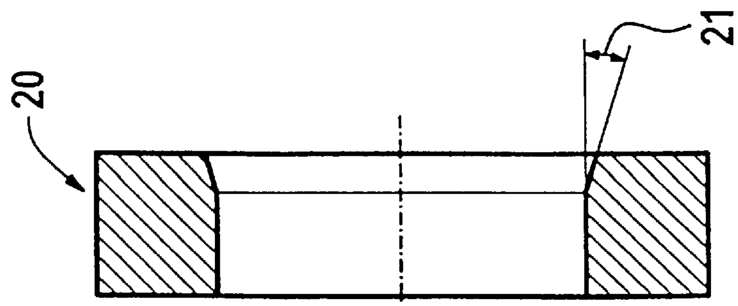
FIG. 6 is a longitudinal section of a ring forming another part of the kit for securement of the bearing assembly to the shaft.
Figure 5:
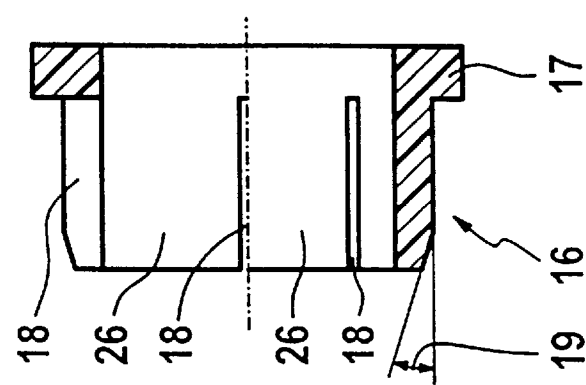
FIG. 5 is a sectional view of the bushing of FIG. 4.
Figure 4:
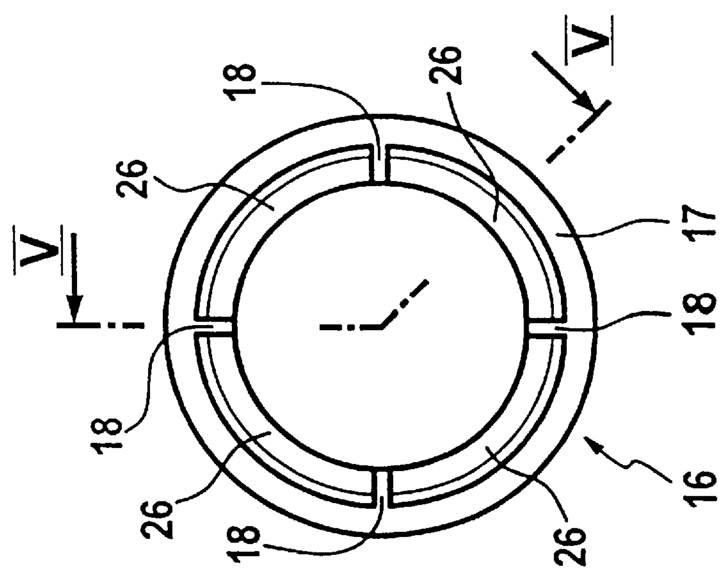
FIG. 4 is a schematic top view of a bushing forming part of the kit for securement of the bearing assembly to the shaft.

Turning now to FIG. 2, there is shown a longitudinal section of the bearing assembly 1 mounted to the shaft 14 by means of a bushing 16 and a ring 20. The installation is as follows: The pre-fabricated bearing assembly 1 is first placed over the shaft 14 until the inner ring 3 of the right-hand grooved ball bearing 2 impacts against a shoulder 15 of the shaft 14. The bushing 16 is then pushed over the shaft 14 until a collar 17 on the ball bearing confronting end of the bushing 16 impacts against the confronting end face of the inner ring 3 of the left-hand grooved ball bearing 2. Thereafter, the ring 20 is placed over the bushing 16 which, as shown in particular in FIGS. 4 and 5, is formed with a plurality of axial slits 18 extending from its collar-distal end inwardly to form a plurality of radially resilient segments 26. Thus, when attaching the ring 20 over the bushing 16, the segments 26 are firmly pressed in radial direction onto the outer surface area of the shaft 14. The bushing 16 as well as the ring 20 have flattened areas 19 and 21, respectively, as shown in FIGS. 5 and 6, to facilitate securement of the bearing assembly 1 on the shaft 14, since threading of the ring 20 over the bushing 16 is simplified as a result of varying diameters.

Figure 3:
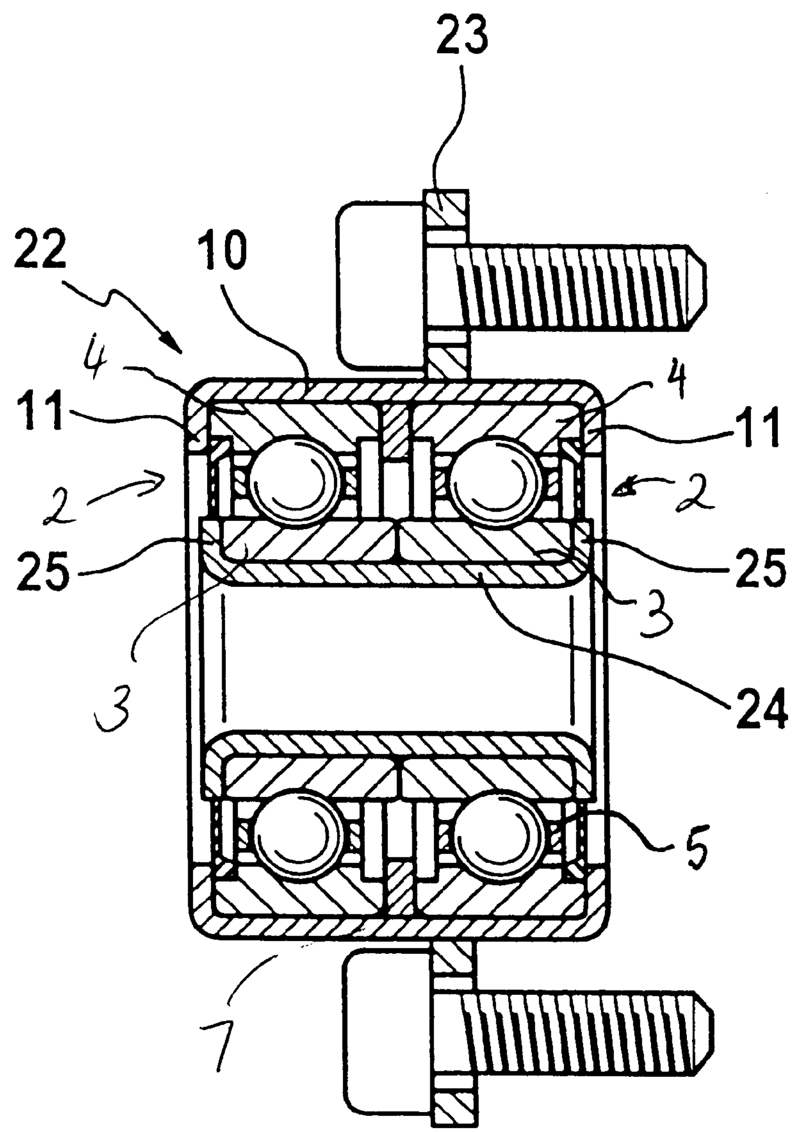
FIG. 3 is a longitudinal section of another embodiment of a bearing assembly according to the present invention.

Referring now to FIG. 3, there is shown a longitudinal section of another embodiment of a bearing assembly according to the present invention, generally designated by reference numeral 22. Parts corresponding with those in the bearing assembly 1 of FIG. 1 are denoted by identical reference numerals and not explained again. The bearing assembly 22 is shown in O-disposition, i.e. both outer rings 4 of the neighboring grooved ball bearings 2 are spaced apart by a gap width which corresponds to the axial thickness of the pertaining fitting key 7. Both grooved ball bearings 2 are received by the sleeve 10 in concentric surrounding relationship about the outer surface area of the outer rings 4, whereby the sleeve 10 includes at its ends the radially inwardly directed projections 11 for embracing the end faces of the outer rings 4. In contrast to the bearing assembly 1 of FIG. 1, the bearing assembly 22 is attached to a housing via a flange 23 which is a separate component and non-detachably connected to the sleeve 10, e.g. through welding. In order to establish a pre-fabricated structural unit under prestress, the bearing assembly 22 includes a second sleeve 24 for receiving both inner rings 3 of the grooved ball bearings 2 about their inner surface area. The sleeve 24 has opposite ends, each of which being formed with a radially outwardly directed projection 25 for embracing the end faces of the inner rings 3.

While the invention has been illustrated and described as embodied in a bearing assembly for a threaded drive, it is not intended to be limited to the details shown since various modifications and structural changes may be made without departing in any way from the spirit of the present invention.

What is claimed as new and desired to be protected by Letters Patent is set forth in the appended claims:

1. A bearing assembly for a threaded drive; comprising:

two rolling bearings in side-by-side disposition, said rolling bearings being formed by grooved ball bearings and suited to one another for adjustment of a desired prestress; and a restraining member for holding the grooved ball bearings in place, said restraining member including a flange, which is directed radially outwards for attachment to a housing, and a sleeve formed by a process without material removal and having one end provided with a radially inwardly directed projection for embracing an end face of the grooved ball bearings.

2. The bearing assembly of claim 1 wherein each of the grooved ball bearings includes an inner ring and an outer ring, and further comprising a fitting key placed between one of neighboring inner rings and neighboring outer rings of the grooved ball bearings.

3. The bearing assembly of claim 2 wherein the key is formed with a beaded portion angled in axial direction.

4. The bearing assembly of claim 1 wherein the grooved ball bearings are placed in one of X-relationship and O-relationship.

5. The bearing assembly of claim 1 wherein the grooved ball bearings have a sealing member at least at their end faces directed away from one another.

6. The bearing assembly of claim 1 wherein the flange of the restraining member is connected in one piece with the sleeve and located at one end of the sleeve.

7. The bearing assembly of claim 1 wherein the flange of the restraining member is fabricated as a separate component and non-detachably secured to the sleeve.

8. The bearing assembly of claim 1 wherein each of the grooved ball bearings includes an inner ring, said grooved ball bearings placed in O-disposition and defining a receiving bore for receiving of a shaft, and further comprising a further sleeve made through a process without material removal and having opposite ends, each of said ends formed with a radially outwardly directed projection for embracing end faces of the inner rings.

9. The bearing assembly of claim 1 wherein the grooved ball bearings have a receiving bore for receiving of a shaft, and a slotted bushing, including a collar, for axially securing the grooved ball bearings on the shaft, and a ring placed over the collar.

10. A bearing assembly for a threaded drive; comprising:

a pair of grooved ball bearings in side-by-side disposition; and biasing means for prestressing the grooved ball bearings so as to realize a pre-fabricated unit suitable for delivery to a customer, said biasing means including a restraining member, which holds the grooved ball bearings in place and has a flange, directed radially outwards, for attachment to a housing, said restraining member being a sleeve, formed by a process without material removal, and having ends, each endprovided with a radially inwardly directed projection for embracing opposite end faces of the bearing assembly.

11. The bearing assembly of claim 10 wherein each of the grooved ball bearings includes an inner ring and an outer ring, said biasing means including a fitting key placed between one of neighboring inner rings and neighboring outer rings of the grooved ball bearings.

12. The bearing assembly of claim 11 wherein the key is formed with a beaded portion angled in axial direction.

13. The bearing assembly of claim 10 wherein each of the grooved ball bearings includes an inner ring and defines a bore for receiving of a shaft, said biasing means including a further sleeve made through a process without material removal and having opposite ends, each of said ends formed with a radially outwardly directed projection for embracing opposite end faces of the inner rings.

14. The bearing assembly of claim 10, and further comprising a kit for mounting the bearing assembly upon a shaft, said kit including a slotted bushing, having a collar, for axially securing the grooved ball bearings on the shaft, and a ring placed over the collar and urging the bushing in radial direction against the shaft.

15. The bearing assembly of claim 14 wherein the bushing is formed with a plurality of axial slits extending from its collar-distal end inwardly to form a plurality of radially resilient segments.

16. The bearing assembly of claim 14 wherein the bushing and the ring are formed with flattened areas to facilitate fixation of the bearing assembly on the shaft.

17. A method for providing a pre-fabricated bearing assembly under prestress for subsequent securement to a shaft, comprising the steps of:

randomly selecting two grooved ball bearings;

placing the two grooved ball bearings in side-by-side disposition;

determining an axial spacing between inner rings or outer rings of the grooved ball bearings in side-by-side disposition;

placing a key in the axial spacing; and fitting the grooved ball bearings in a sleeve formed by a process without material removal to thereby realize a self-contained, prefabricated complete bearing assembly under prestress.

18. The method of claim 17, and further comprising the steps of pushing the pre-fabricated bearing assembly over a shaft; placing a bushing over the shaft until a collar of the bushing impacts a confronting end face of the bearing assembly; and attaching a ring over the bushing to thereby firmly press the bushing in radial direction against the shaft.

* * * * *